(No Model.) 8 Sheets—Sheet 1.

G. ANDERSON.
PLANT FOR ELEVATING TRUSSES OR GIRDERS.

No. 454,444. Patented June 23, 1891.

Fig. 1.

Witnesses:
Joseph M. Crane
Chas. F. Dane

George Anderson, Inventor.
by Chas. Dane Jr.
his Atty.

(No Model.) 8 Sheets—Sheet 2.

G. ANDERSON.
PLANT FOR ELEVATING TRUSSES OR GIRDERS.

No. 454,444. Patented June 23, 1891.

Fig. 2.

Witnesses:
E. J. Cunningham
Chas. F. Dane

Inventor:
George Anderson
by his Atty
J. Chr. Dane Jr (No Model.) 8 Sheets—Sheet 3.
G. ANDERSON.
PLANT FOR ELEVATING TRUSSES OR GIRDERS.

No. 454,444. Patented June 23, 1891.

Witnesses:
E. J. Cunningham
Chas. F. Dane

Inventor:
George Anderson
by his Atty
J. Ed. Dane Jr.

(No Model.) 8 Sheets—Sheet 5.

G. ANDERSON.
PLANT FOR ELEVATING TRUSSES OR GIRDERS.

No. 454,444. Patented June 23, 1891.

Fig. 7.

Witnesses
Joseph M. Crane
Chas. F. Dane

George Anderson
Inventor:
by J. P. Dane Jr
his Atty.

Fig. 8.

(No Model.) 8 Sheets—Sheet 8.

G. ANDERSON.
PLANT FOR ELEVATING TRUSSES OR GIRDERS.

No. 454,444. Patented June 23, 1891.

Witnesses:
Joseph M. Crane
Chas. F. Dane

George Anderson Inventor:
by Jno Dane Jr
his Atty

UNITED STATES PATENT OFFICE.

GEORGE ANDERSON, OF MADRAS, INDIA.

PLANT FOR ELEVATING TRUSSES OR GIRDERS.

SPECIFICATION forming part of Letters Patent No. 454,444, dated June 23, 1891.

Application filed October 5, 1888. Serial No. 287,345. (No model.) Patented in England June 11, 1888, No. 8,542.

*To all whom it may concern:*

Be it known that I, GEORGE ANDERSON, district engineer to the District Board of Malabar, Medical Institute, C. E. London, a subject of the Queen of Great Britain, and residing at Madras, in the Empire of India, have invented new and useful Improvements in Truss or Girder Lifting Plants, (for which I have obtained patents in England June 11, 1888, No. 8,542,) of which the following, taken in connection with the drawings, is a specification.

My invention relates to improvements in plants for lifting, handling, traversing, and placing in position trusses or beams, girders, &c., and is more particularly adapted to expedite the raising and placing in position upon piers or other suitable supports of the beams, trusses, &c., used in the building and construction of bridges. Formerly in the building of bridges, &c., after the piers or other supporting structures were built, a high and expensive scaffolding was generally constructed, by or upon which the material for the construction of the trusses and girders was elevated and placed in position, and upon which much valuable time and labor were expended and great expense incurred. Now, according to my invention, the trusses or beams may be erected upon the ground or a little above water-level at or near the foot of the piers or other supports, thus admitting of the fitting and erection being completed more quickly, and of course more cheaply, than if carried out on the high and narrow scaffolding heretofore used with the erecting of said truss or girders, and simultaneously with the constructing of said trusses, girders, &c., the "plant" may be raised and put together upon the piers or other supports, (the same being thoroughly portable, easily handled, and quickly put together, as will be explained hereinafter,) ready to lift said trusses or girders as soon as they are completed. In those cases where pile-work has to be carried out in deep water for false works to carry on the erection of the trusses or beams at or near water-level, and to be raised and placed in position by the use of my plant, the work will of course be much lighter and cheaper than if it were required to carry false works fifty, one hundred, or one hundred and fifty feet high, as the case might be, for the raising and erection of the same. In cases heretofore where from forty to sixty men have been employed for one month in erecting false works one hundred feet high for a span of four hundred to five hundred feet the trusses could either have been built upon barges and floated out in position for raising or they could have been built upon false work raised only a few feet above water-level and raised therefrom by the use of my improved plant, by which means from two weeks to one month in amount of time might have been saved in the erection of the same. The lifting of the trusses and beams of any weight and class can by the use of my plant be proceeded with at the rate of fifty to sixty feet per day, according to circumstances.

My invention therefore consists in, first, a superstructure adapted to rest upon the top of piers or other support, carrying a cantalever adapted to support the power and machinery required to operate—that is, lift, handle, traverse and place in position the trusses or beams; second, the power and machinery consisting of screw or other jacks M or other suitable power, lifting-pins or other suitable connection, (represented at N,) relieving-pins or other suitable connection N' N², and traversing power of any suitable description attached to or carrying each jack M or the whole of the jacks, or other suitable power may be fitted in or carried upon a single or double frame or track to admit of the whole of the said jacks or other power and their loads of the trusses or beams, &c., and the chain G G G and the links or bars J and K being moved or traversed horizontally continuously from the ends of the cantalever B to any required point situated between said ends and the center of the said cantalever; third, the chain consisting of the pin-connected links or bars G G G, attached in any suitable manner to the truss or beam Q to be lifted and operated, and also connected to or with the screw or other jacks or any suitable power M employed for operating, lifting, traversing, and placing in position the said truss or beam, &c., Q by means of the lifting-pin or other suitable connection N, the bars or chain G G G, the same to have holes or other suitable arrangement at suitable distances apart to take the hanging and relieving pins or other suitable connection N' N² as the pin N or other suitable connection is removed from its hole or opening, the purpose to be explained hereinafter.

The several parts of my invention are illustrated in the accompanying drawings, in which—

In the drawings, and referring more particularly to Figs. 1, 2, 3, 4, 5, and 6, A is the superstructure, adapted to be constructed on piers or other supports, as shown at E E, and may be of any suitable construction.

B is a cantalever supported on the top of the said superstructure A, and upon which screw-jacks M or other lifting power is adapted to be supported and operated upon suitable frames. I do not restrict myself to any specified number of jacks, if such be used as the lifting power, as any number may be used, according to circumstances. The said jacks or lifting power are adapted to be supported on a frame of suitable construction, which latter is adapted to be traversed or slid on the said cantalever and be operated—that is, traversed back or forth on said cantalever simultaneously from opposite ends toward the center (carrying the girders, beams, &c., attached thereto in position to be placed on the piers) by a suitable winding-gear arranged and secured on said cantalever, or by other suitable means. It is obvious, however, that the said frames for supporting the jacks or lifting power may be provided with running-gear and operate or traverse the cantalever on suitable tracks located thereon.

Figure 1:
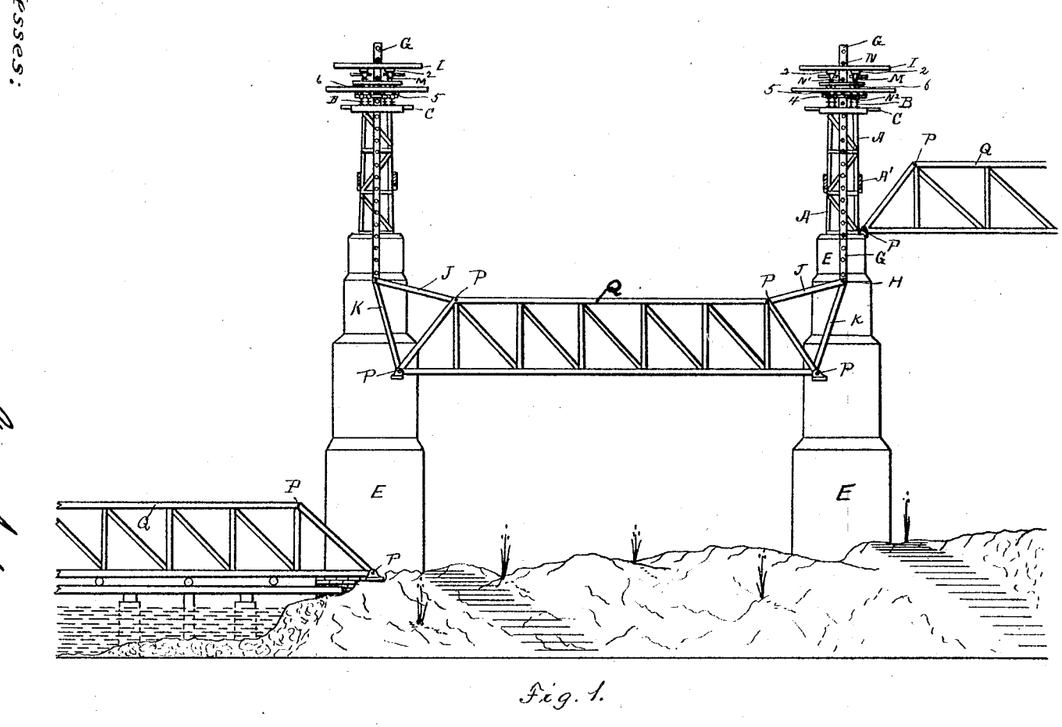
Figure 1 represents my improved plant in position upon piers for elevating truss or girders.
Figure 2:
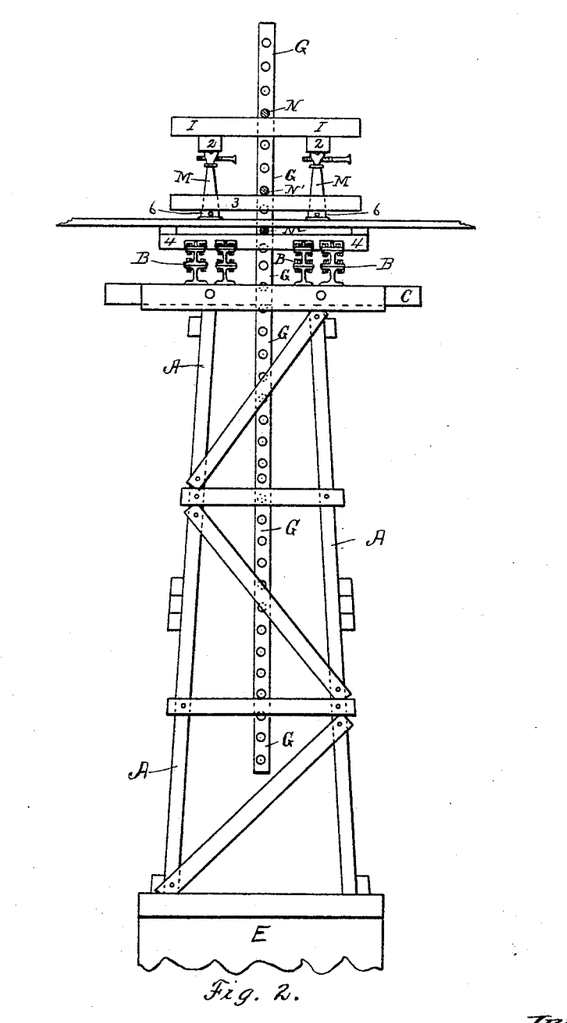
Fig. 2, an enlarged end view of one of the same.
Figure 3:
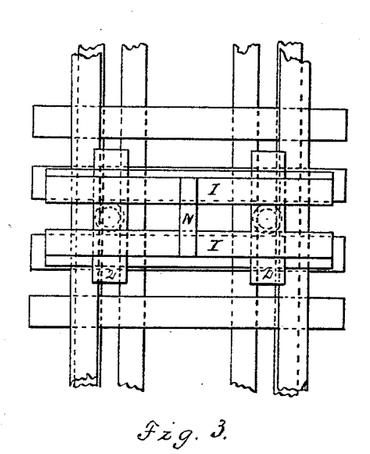
Figs. 3, 4, and 5 represent detail parts to be described hereinafter.
Figure 4:
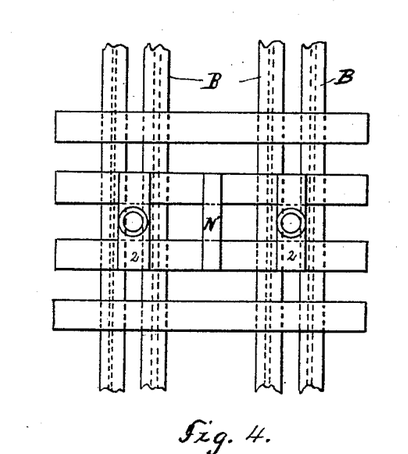
Figure 5:
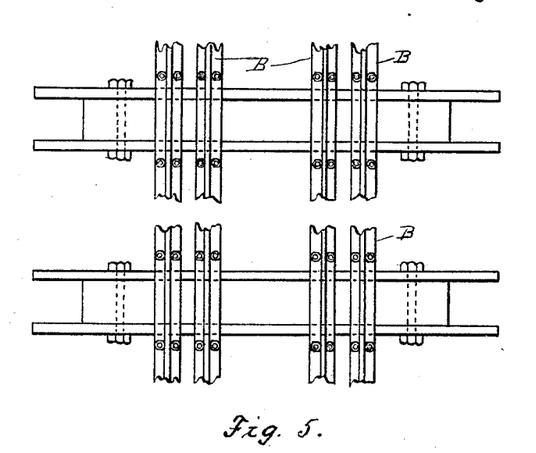
Figure 6:
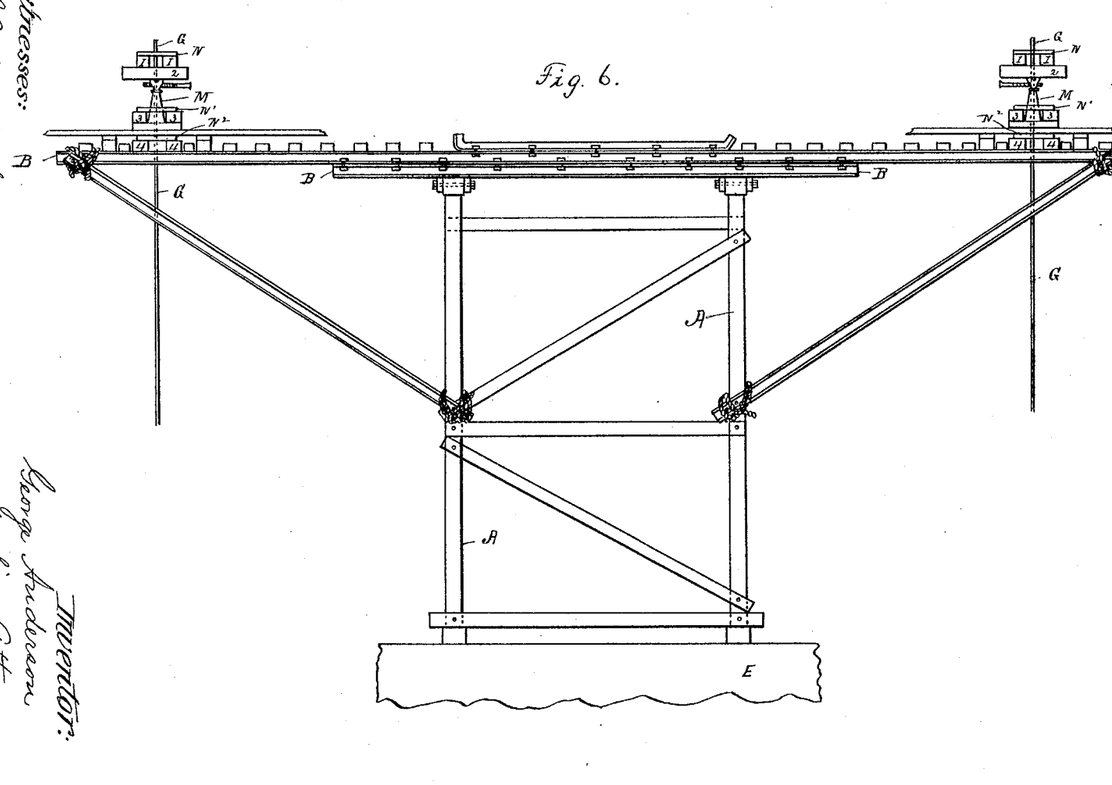
Fig. 6 represents a side view of the plant as shown in Fig. 2.

G is a lifting device, consisting in the present instance of a bar, although it may be a series of links or bars provided with holes, or any other suitable arrangement, located at suitable distances apart in said bar or chain connection, supported by a lifting-pin N and relieving-pins N' N². The said lifting-pin N consists of a pin adapted to intersect one of the openings in said bar or chain G and rest or have a bearing upon a frame supported on the jacks M. In the instance shown, beams or bars I I rest upon beams 2 2, said beams 2 2 rest upon single jacks M, as more clearly shown in Fig. 2, and the lifting-pin N passes through an opening in said bar or chain G and rests or has a bearing at opposite ends thereof upon said bars I I, as shown in Fig. 2. It is obvious, however, that four jacks, or as many more as may be desired, may be used upon which to rest the beams or bars 2 2, as there would be less liability of any swaying or moving of the lifting power if there were four used than if a less number. The relieving-pins N' N² are adapted to connect with said chain G and have a bearing upon beams, as shown at 3 and 4, or any convenient bearing, and be so placed in position and in such manner as to admit of the weight of the chains G and the trusses or girder attached to the lower end thereto being removed from the jacks M or other lifting power and applied direct to the cantalever B, to admit of the jacks M being lowered and the lifting-pin N removed and again connected with the said bar or chain G at a lower point therein, and in such position that the lifting power may be again applied to said lifting-pin N, thus raising the chain G with its load attached thereto. In those cases where the trusses or girders to be raised are of such length that the chain G may not be attached directly thereto, and the point of connection is not immediately vertically below the said lifting power and the weight not directly below the said jacks or lifting power, I use two or more detachable links or bars, substantially such as shown at J and K in Fig. 1, and connect the same by suitable means to the truss or girder to be lifted at P P, (see Fig. 1,) and connect the same at their opposite ends to the chain G at H by a pin or other suitable means, and at such distance from the said truss or girder as to bring the point of lifting H immediately below the lifting power.

The operation of my improved plant for lifting girders, trusses, beams, &c., as set forth, is as follows: First, the trusses, beams, girders, or other frame-work to be raised will first be constructed and then placed along the face of the bridge from abutment to abutment, or abutment to pier, or pier to pier, on the ground or at or near water-level, the girders and trusses being placed at opposite sides of the abutments or piers. The trestle or other suitable superstructure A A having been erected upon the top of the pier E E or other supports with sufficient space upon either side of the same for the support of the trusses or girders, the cantalevers B B will then be erected or placed on said superstructure A A. The jacks or other lifting power and the frame upon which the same is supported and traversed are erected and supported upon said cantalevers, the frame consisting of beams 1 and 2, or other suitable arrangement placed or erected on the jacks M or other lifting power for supporting and carrying the lifting-pins N, and a secondary frame-work consisting of beams 3 and 4 or other suitable arrangement having its bearing directly on the cantalever B, for carrying the relieving-pins N' N². The said secondary frame-work is located at the outer ends of the cantalevers beyond the lifting power in such a manner as not to interfere with said lifting power and supporting-frame when the latter is traversed toward the center of the cantalever. While the foregoing operations are in progress the chain G G should be fitted together upon the ground in such manner, generally in a straight line, as to prevent all chance of kinking or doubling while it is being hoisted for connection with the lifting-pins N and relieving-pins N' and N². Simultaneously with the foregoing operations the links or bars J and K, if required, should also be fitted up and attached to the truss or girder Q, to be lifted at P P or other suitable points and made ready to be united or connected to the lower end of the chain G at H when said chain G G has been lifted and proper connection been made with the pins N N' N². As soon as the foregoing operations have been carried out the bar or chain G G should be lifted by any suitable means till it is taut between the lifting-pin N and its point of connection with the beam, truss, girder, or other object to be lifted, or in case the links or bars J and K are used at the point H. Then the pins N N' N² or other suitable connection will be fitted to the chain G G, and the said chain is connected with or to the bars J and K at H or at any suitable point, and the lifting of the truss, beam, or girder Q will be proceeded with by operating the jack M or other lifting power to any desired height, when the load is then thrown onto the relieving-pins N' N² and their bearings 3 and 4, by which means the load will be transmitted direct to the cantalever and thus allow the load to be removed from the lifting-pin N and lifting power or jacks M. After the relieving-pins N' and N² have thus received the load the lifting-pin or other lifting connection will be removed or disengaged from the chain G G and placed in the next hole or opening or attached to any suitable arrangement at a point below where it was last used for lifting, and the jacks or lifting power lowered accordingly, and another lift will then be made, when the load will again be transmitted to the relieving-pins N' N² or other suitable connection, union-wedges or other suitable packing being placed below the same and upon the bearings 3 and 4 to take the load without any direct shock to the cantalevers and the lifting-pin or other connection N be again removed from the chain G G and placed or connected at a lower point in the said chain to form a new connection with the lifting power or jacks M, then another lift will be made, and so on until the truss, girder, or beam has been lifted to its permanent or required level. After the trusses or girders have been raised to the required level the frames upon which the jacks or lifting power are supported are moved or traversed horizontally on the cantalever B toward the center of the same, carrying the load Q horizontally into position on the piers or other support.

Figure 7:
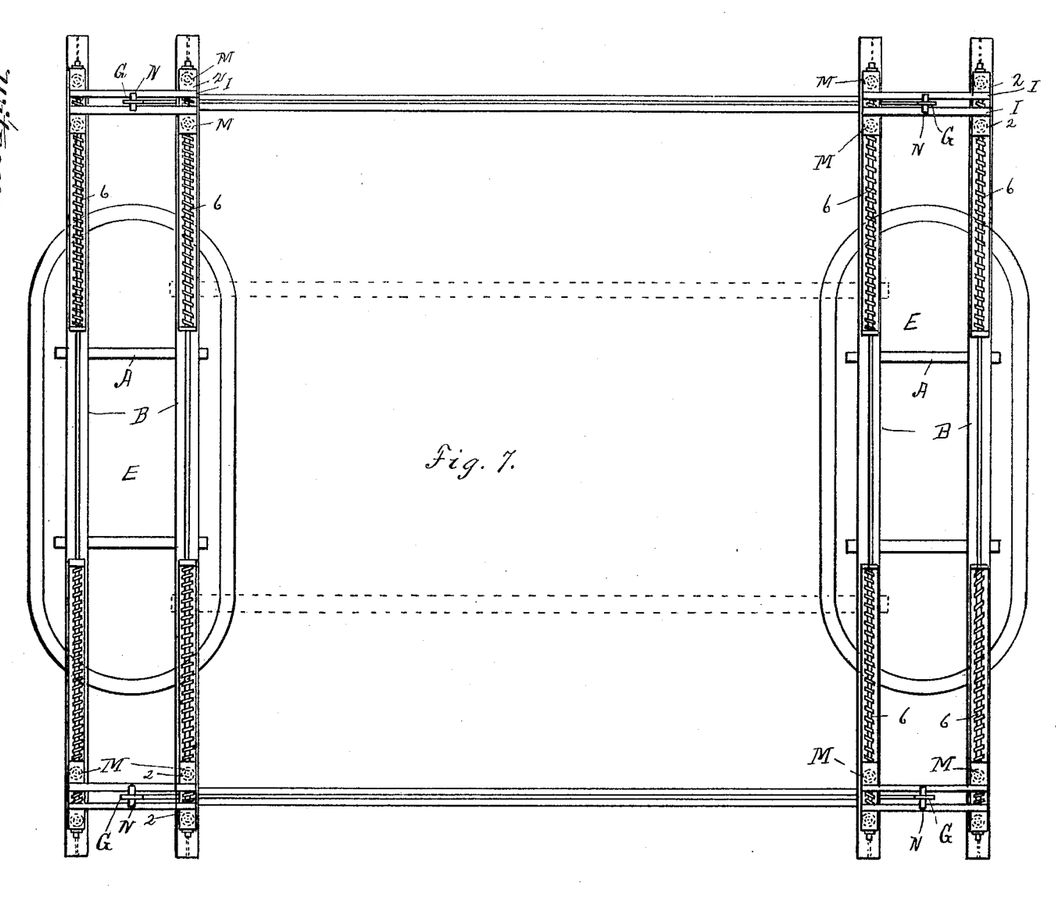
Fig. 7, a plan view of the plant in a modified form.
Figure 8:
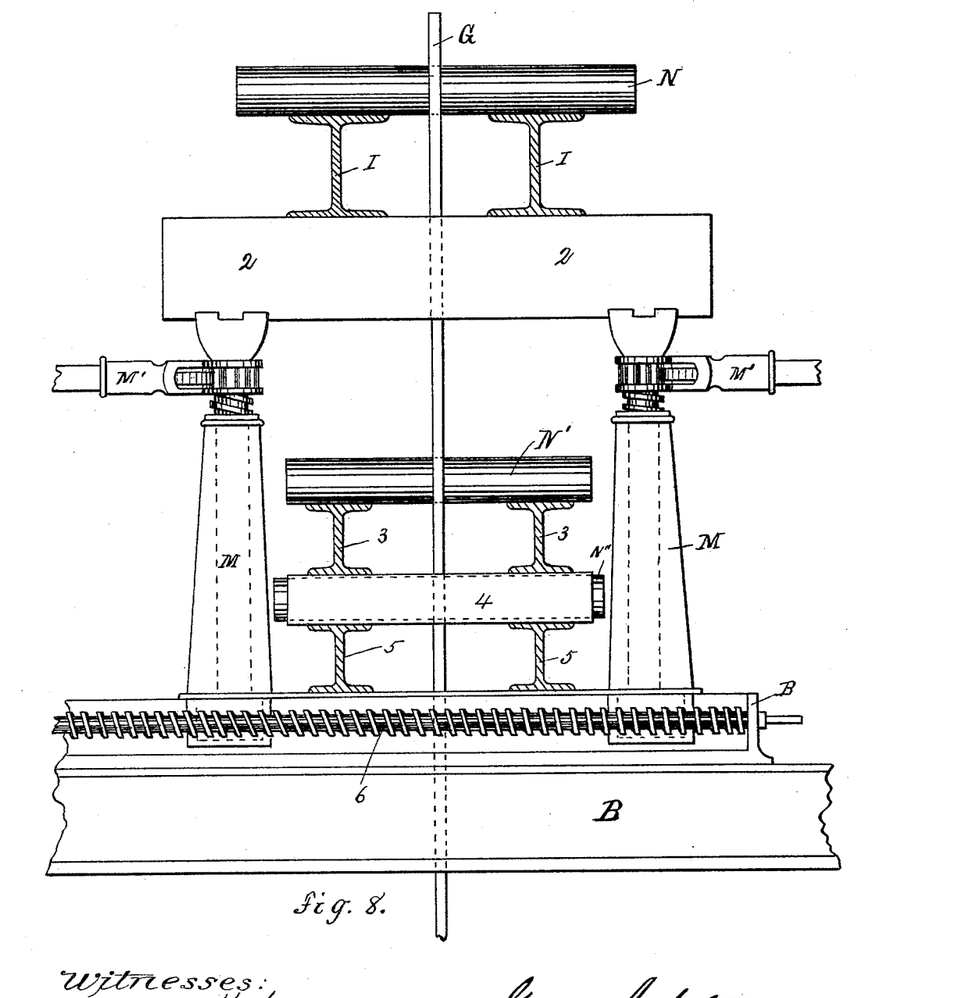
Fig. 8, an enlarged end view (broken away) of the plant as shown in Fig. 7.
Figure 9:
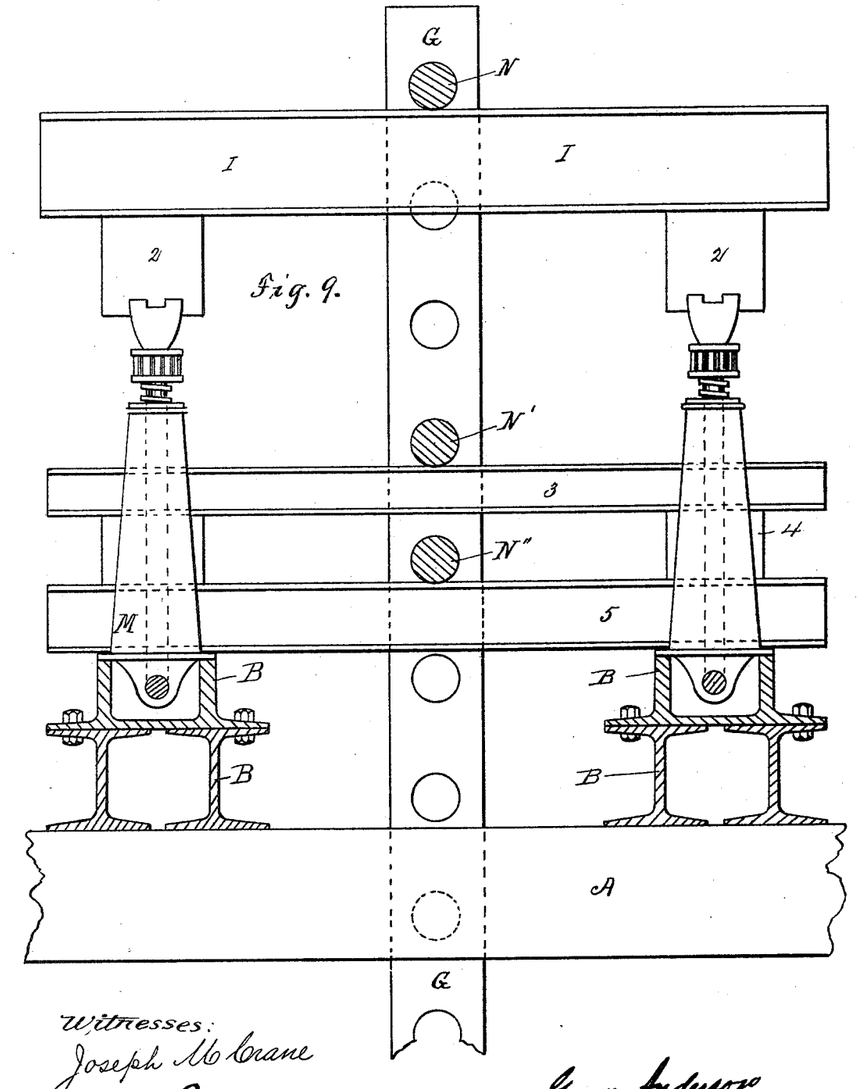
Fig. 9, a side view of the plant shown in Fig. 8.

Referring to Figs. 7, 8, and 9, I have illustrated a slightly-modified means for operating or traversing the jacks or other lifting power. In this instance I employ screws, (represented at 6,) which are arranged and supported in a horizontal position in suitable bearings upon the cantalever and extend nearly the entire length of the latter, in order to engage at either end with the jacks or lifting power supporting frame at both ends of the said cantalever. The frames upon which the jacks are supported are provided with screw-threaded openings therein through which the said screws 6 extend, as more clearly shown Figs. 8 and 9, to operate the said frames and the several parts supported thereby. Thus it will be readily understood that by turning or revolving the screws 6 at one end by a crank or other suitable means the frames engaged thereby and the several parts supported by the said frames are caused to traverse simultaneously toward the center of the cantalever for the purpose as hereinbefore set forth. M' represents a lever and ratchet for operating the jacks M.

Figure 10:
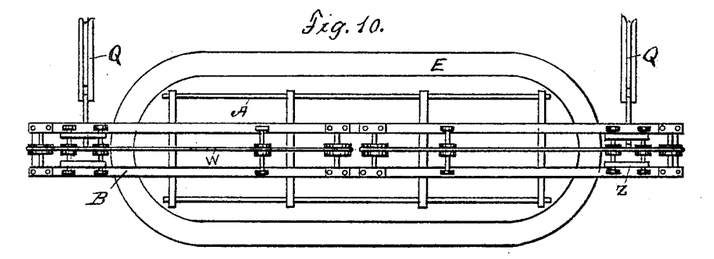
Figs. 10 and 11, a plan and end view, respectively, of the plant in another modified form.
Figure 11:
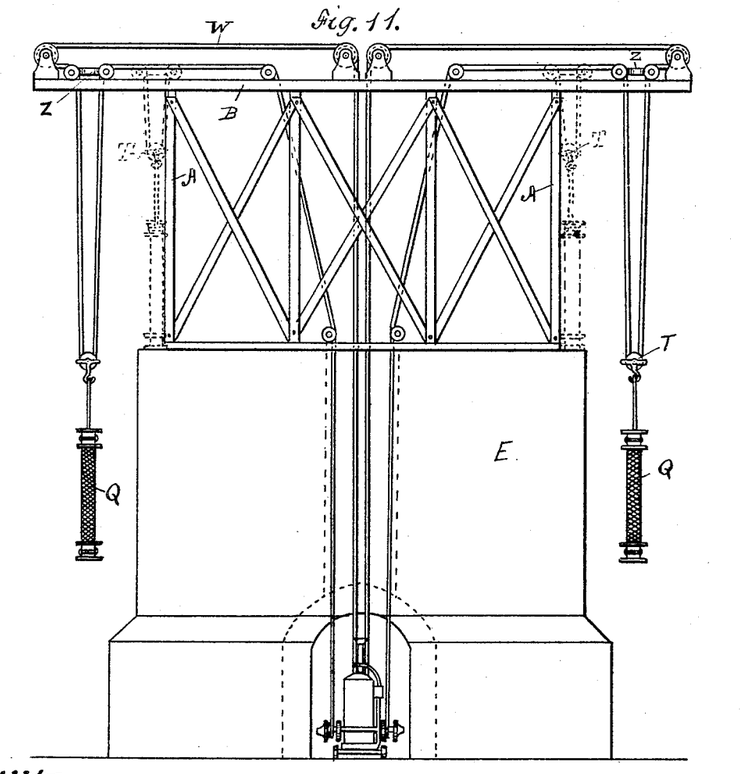

Referring to Figs. 10 and 11, I have shown a carrier Z and a running pulley T for traversing the trusses or girders through the medium of a rope or other flexible connection and an operating-engine, in lieu of the jacks, screws, &c., as described. In this instance the carriers Z, which support and carry the truss or girders through the medium of the rope W and pulleys T, are adapted to slide or operate in suitable ways or tracks on the cantalever B. The truss or girders are elevated by the rope or other flexible connection W by means of a "hoisting and hauling engine," so called, the said rope being adapted to pass and operate over suitable stationary pulleys located on the cantalever and the superstructure at suitable points for its proper operation, as clearly shown.

The trusses and girders are elevated and traversed as follows: To elevate the truss or girders both ends of the rope are taken up by winding the same around a suitable drum or drums by the engine, thereby elevating or raising the truss or girders, and to move the carriers toward the center of the cantalever, in order to bring the truss or girders in position over the pier or other support E, as shown in dotted lines in Fig. 11, that part of the rope which passes over the outer end of the carrier is loosened or slacked by the action of the engine, and that end of the rope which passes over or through the inner end of the carrier is taken in or hauled upon by the engine, which described action serves to move the carrier toward the center of the cantalever, as will be readily understood by those skilled in the art.

In order to cause the carrier to move outward or toward the end of the cantalever, the hauling and loosening or slacking action on the opposite ends of the rope is reversed, as will appear obvious.

Having thus set forth my invention, what I claim as new, and desire to secure by Letters Patent of the United States, is—

1. The combination, with a pier or tower, of a trestle or frame provided with cantalevers secured thereto, a lifting apparatus, and carrier, substantially as and for the purpose set forth.

2. The combination, with a pier or tower, of a frame located upon or near the top of said pier, &c., supporting a cantalever, and a lifting apparatus supported upon and carried by a movable frame, substantially as and for the purpose set forth.

3. The combination, with a pier or tower, of a trestle or frame supported upon the latter, provided with a cantalever forming a part of said frame, a lifting apparatus supported upon a movable frame, and a track for guiding the latter, substantially as and for the purpose set forth.

4. The combination, with a pier or other elevated structure, of a frame or other superstructure provided with a cantalever resting upon and supported by said pier, &c., and a system of jacks for lifting supported upon and carried by a movable frame resting upon said cantalever, substantially as and for the purpose set forth.

5. The combination, with a pier or other elevated base, of a trestle or frame supported upon said pier, &c., provided with a cantalever forming a part thereof, a system of jacks or other lifting apparatus, and perforated bars or links, substantially as and for the purpose set forth.

6. The combination, with two piers or other elevated structures, of frames forming superstructures supported by said piers, &c., with a system of cantalevers serving as track-beds upon which movable frames are supported and operated, the latter carrying a lifting apparatus for operating perforated connections held at convenient points by pins, substantially as set forth.

7. The combination, with a pier or tower, of a trestle or frame provided with cantalevers secured thereto, a lifting apparatus, carrier, and perforated connections provided with adjustable angular device for connecting and guiding a truss or other frame to be lifted and placed in position upon the piers or tower, substantially as set forth.

GEO. ANDERSON.

Witnesses:
CHAS. F. DANE,
E. J. CUNNINGHAM.